United States Patent [19]

Murphy et al.

[11] Patent Number: 4,848,574

[45] Date of Patent: Jul. 18, 1989

[54] STORAGE DEVICE FOR FLOPPY DISKETTES

[75] Inventors: Kent W. Murphy, Wooster; Charles W. Craft, Jr., Apple Creek, both of Ohio

[73] Assignee: Rubbermaid Incorporated, Wooster, Ohio

[21] Appl. No.: 184,412

[22] Filed: Apr. 21, 1988

[51] Int. Cl.⁴ .............................................. B65D 85/57
[52] U.S. Cl. ................................... 206/444; 206/425; 220/22; 220/335; 211/11; 211/50
[58] Field of Search ....................... 220/22.2, 22.1, 22, 220/335, 338; 206/425, 444, 309; 312/13; 211/11, 40, 50

[56] References Cited

U.S. PATENT DOCUMENTS

| | | | |
|---|---|---|---|
| 2,527,318 | 10/1950 | Magnus | 220/338 |
| 4,366,904 | 1/1983 | Roskvist | 220/223 |
| 4,407,411 | 10/1983 | Lowry | 220/22 |
| 4,498,583 | 2/1985 | Long | 206/425 |
| 4,684,019 | 8/1987 | Egly | 206/444 |
| 4,696,412 | 9/1987 | McGowan | 220/335 |
| 4,729,475 | 3/1988 | Kurkjian | 206/425 |

*Primary Examiner*—Stephen Marcus
*Assistant Examiner*—Gilbert W. Reece
*Attorney, Agent, or Firm*—Renner, Kenner, Greive, Bobak, Taylor & Weber

[57] ABSTRACT

A container (10) for computer floppy diskettes (D) and the like includes a body portion (11, 12, 13, 14, 15) open at the top and a cover (16) attached to the body portion (11, 12, 13, 14, 15) by a hinge assembly (45) which limits the movement of the cover (16) such that when it is fully open, it extends generally vertically upward thereby not unnecessarily using space. The container (10) is provided with file dividers (29) which are arcuately movable therein. Upon closure of the cover (16), if one or more of the dividers (29) is in the way, a camming surface (44) carried by cover (16) engages the divider (29) and swings it out of the way so that complete closure can be effected.

13 Claims, 4 Drawing Sheets

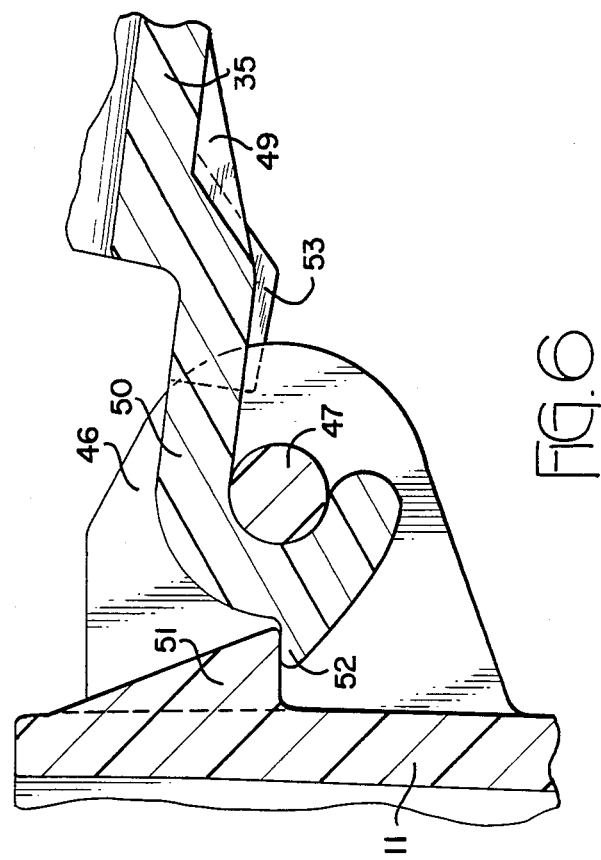
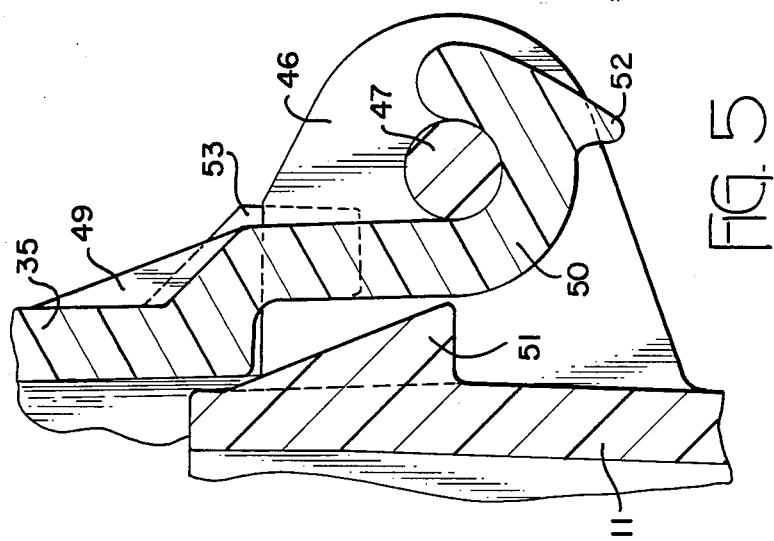

STORAGE DEVICE FOR FLOPPY DISKETTES

TECHNICAL FIELD

This invention relates to a storage device designed to conveniently house computer floppy diskettes. More particularly, this invention relates to such a storage device which includes a top which is easily closable without interference with the stored diskettes, which top, when open, is maintained in a vertical, space saving position by a unique hinge configuration.

BACKGROUND ART

There are numerous file-like boxes or containers available for the storage, at home or in the office, of computer floppy diskettes and similar products. However, most, if not all, of these containers are fraught with various problems or inconveniences rendering them at times undesirable to the consumer. For example, in many configurations the top closure for the container will tend to engage the diskettes stored therein upon closure thereby either detrimentally bending the diskette or making a complete closure improbable. As such, rather than closing, the top closure will merely rest on top of the diskettes with complete closure only being possible by the user opening the cover and flipping the diskettes angularly rearwardly so that the cover clears the same upon closure.

In addition, in most such containers the cover is attached to the body of the container with some type of hinge structure, such as the conventional "living hinge". When open, these types of hinges will permit the cover to be generally horizontally disposed in a cantilever fashion away from the body of the container. Unfortunately, such a configuration not only takes up space in the office environment but it also lends a degree of instability to the container itself when open.

Furthermore, most currently available containers only have the capability of storing individual diskettes side-by-side and do not enable the user to store therein one or more of the handy portable carrying cases which themselves hold a plurality of diskettes.

DISCLOSURE OF THE INVENTION

It is therefore a primary object of the present invention to provide a container for diskettes and the like which is convenient to use.

It is another object of the present invention to provide a container, as above, which is conveniently and easily closable without damage to the diskettes carried therein.

It is an additional object of the present inveniton to provide a container, as above, which upon closing positions the dividers which segregate the diskettes such that when the container is opened again, the dividers are in their optimum viewing position.

It is a further object of the present invention to provide a container, as above, which does not take up excess space when in an open position.

It is yet another object of the present invention to provide a container, as above, which is stable and not susceptible to tipping when in an open position.

It is a still further object of the present invention to provide a container, as above, which can carry individual diskettes as well as carrying cases containing a plurality of diskettes.

These and other objects of the present invention, as well as the advantages thereof over existing prior art forms, which will become apparent in view of the description to follow, are accomplished by the means hereinafter described and claimed.

In general, a container for computer floppy diskettes and like products includes a body portion open at the top and a cover hingedly attached thereto such that when the cover is fully open, it extends generally vertically upward. File dividers are arcuately movably mounted in the body portion and if they are in the way of a complete closure of the cover onto the body portion, a camming surface carried by the cover engages the divider and swings it out of the way so that complete closure can be effected.

BRIEF DESCRIPTION OF THE DRAWINGS

FIG. 5 is a sectional view taken substantially along line 5—5 of FIG. 4 and showing the position of the hinge construction when the cover is closed on the body of the container.

FIG. 6 is a sectional view similar to FIG. 5 but showing the position of the hinge construction when the cover is swung open from the body of the container.

EXEMPLARY EMBODIMENT FOR CARRYING OUT THE INVENTION

Figure 1:
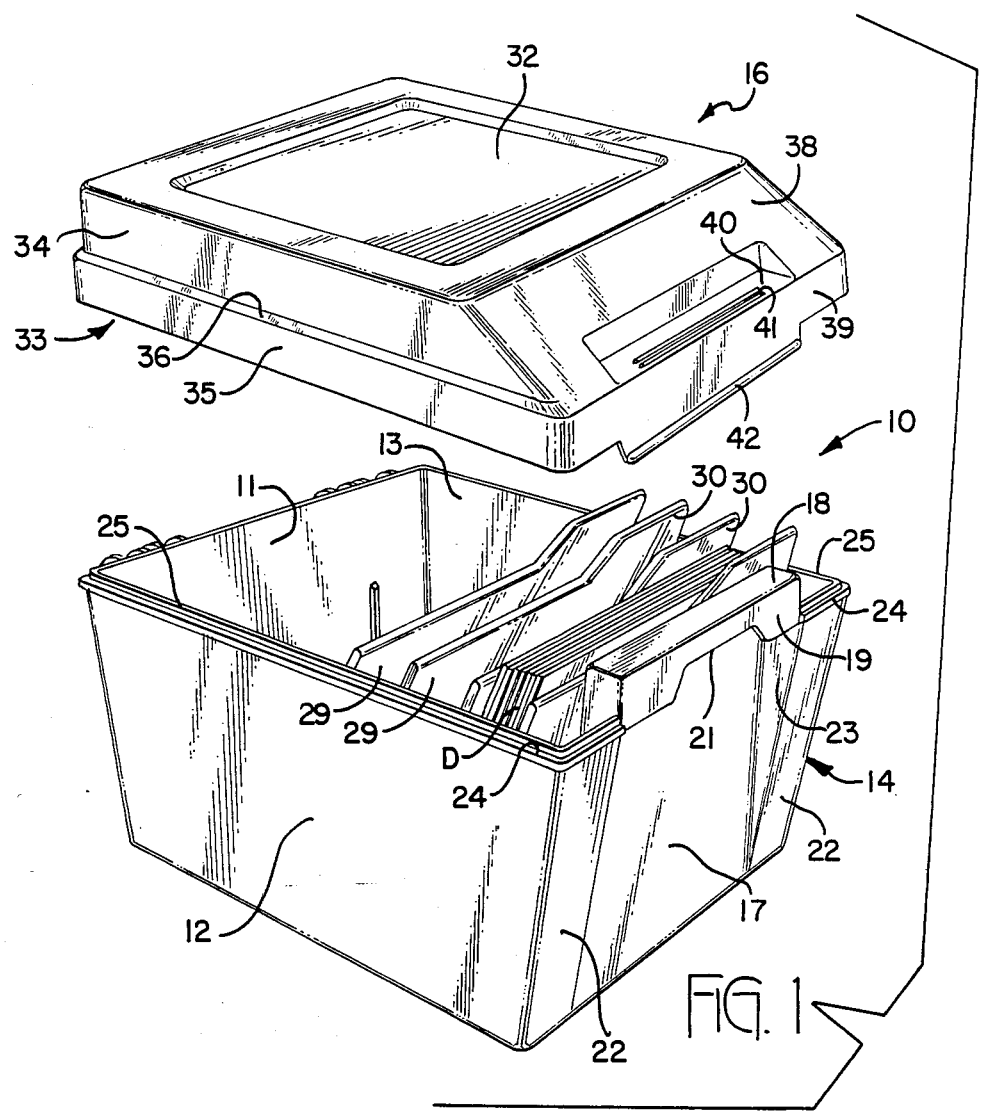
FIG. 1 is an exploded perspective view of a container according to the concept of the present invention.

A container for holding computer floppy diskettes or the like is indicated generally by the numeral 10 in the drawings and includes a body portion defined by a generally vertical back wall 11, generally vertical side walls 12 and 13, a front wall generally indicated by the numeral 14, and a bottom 15. Container 10 also includes a cover generally indicated by the numeral 16 which closes the otherwise open body portion of container 10.

Figure 2:
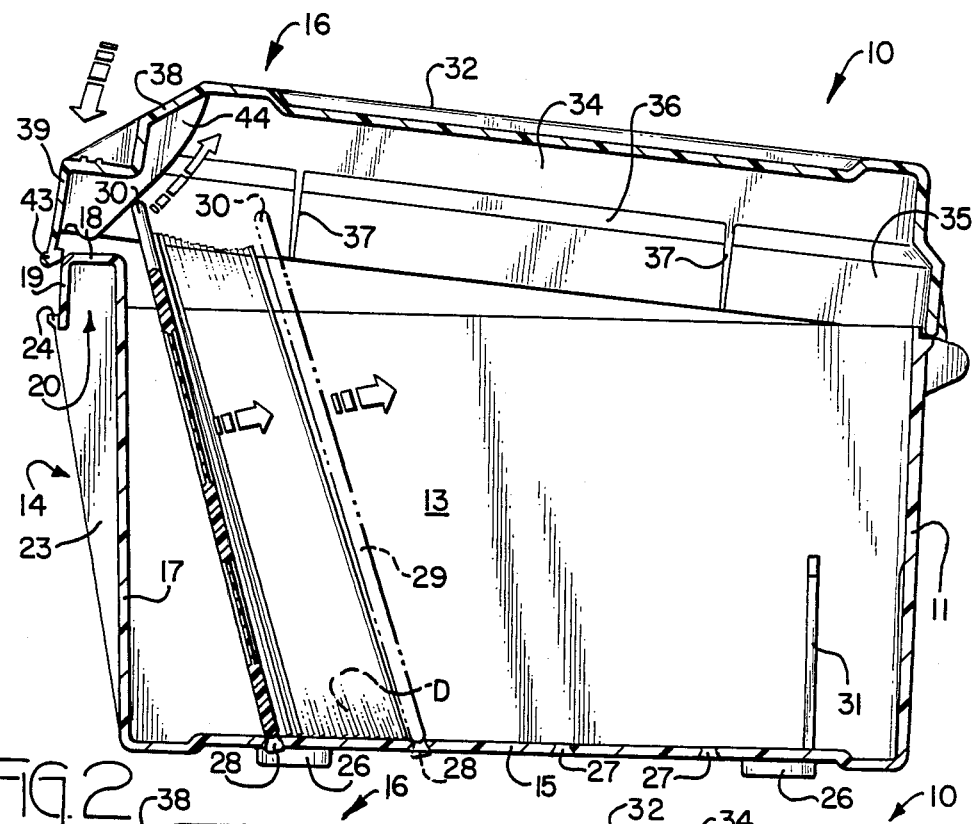
FIG. 2 is a sectional view of the container in a position as the cover is being closed.
Figure 3:
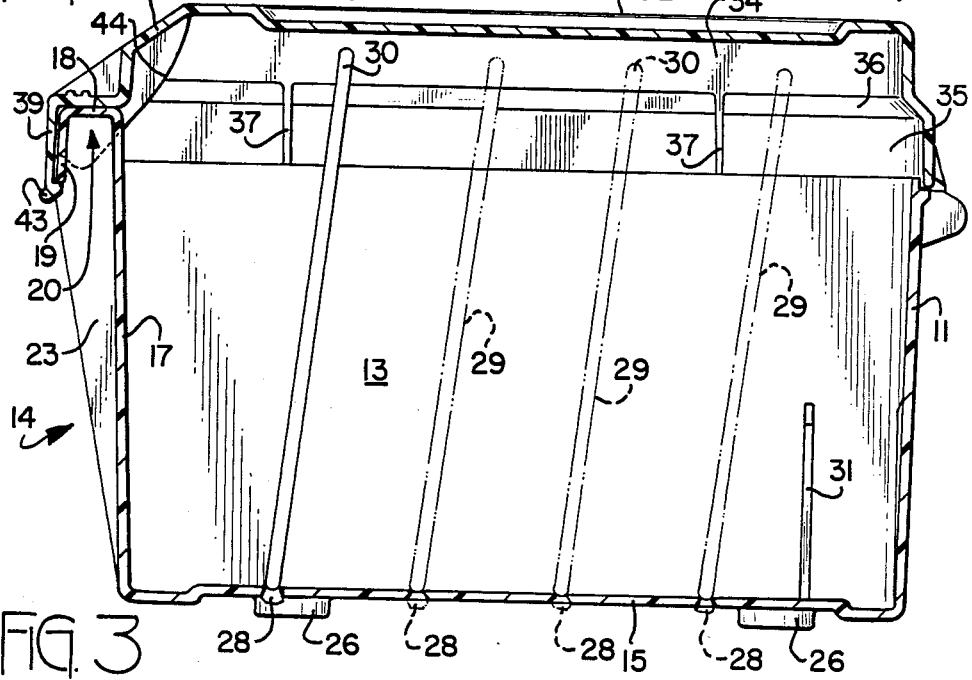
FIG. 3 is a sectional view of the container in a fully closed position.

As best shown in FIGS. 1-3, front wall 14 includes a central generally vertical wall portion 17 extending upwardly from bottom 15 and terminating at the top as a generally horizontal cover mating surface 18. A flange 19 extends downwardly from the outer edges of surface 18 to define a gripping area generally indicated by the numeral 20. A cutout portion 21 (FIG. 1) in flange 19 assists the user in gripping the container 10 for transportation thereof. Front wall 14 also includes two edge walls 22 extending slightly angularly upwardly from bottom 15 and terminating at the top at a point generally coincident with the lower edge of flange 19. Outwardly extending walls 23 connect vertical wall portion 17 to edge walls 22.

The top edge of edge walls 22 as well as the top edges of side walls 12 and 13 and back wall 11 are provided with a continuous generally horizontal ledge 24. A lip 25 extends upwardly around the inner periphery of ledge 24. As will hereinafter become more fully evident, when container 10 is closed, cover 16 rests on ledge 24 and engages lip 25.

Bottom 15 of container 10 includes a plurality of feet 26 for the stable placement of container 10. Bottom 15 also has a plurality of spaced apertures 27 extending therethrough to receive lock barbs 28 on the lower end of diskette file dividers 29. As many dividers 29 as desired are positioned in container 10 merely by snapping their barbs 28 through selected of the spaced apertures. Thus, diskettes D of a particular subject matter can be segregated between dividers 29 in a normal file drawer fashion. Dividers 29 are arcuately swingable about their barbs 28 and have conventional tabs 30 at their upper ends which can be utilized to inscribe information regarding the diskettes behind the particular divider and also can be utilized as a gripping area to manually swing the dividers 29 about barbs 28. The dividers 29 can be selectively inserted in apertures 27 in either direction, that is, so that tabs 30 are on the right, as shown in FIG. 1, or they can be reversed so that tabs 30 are on the left, or on both sides as may be desired.

Side walls 12 and 13 are shown as being provided, internally thereof, with corresponding ribs 31 (FIGS. 2 and 3) extending slightly inwardly of side walls 12 and 13 and strategically spaced from back wall 11 by a distance to coincide with the depth of conventional diskette carrying cases. Such cases typically hold five diskettes so that the same can easily and protectedly be carried from place to place. Ribs 31 provide a manner of storing such cases when not in use. One merely slides the case into the space between ribs 31 and back wall 11 and it will stand erect and secured within container 10. Of course, should it be desirable to provide container 10 with the capability of holding additional diskette carrying cases, additional ribs 31, appropriately spaced from the ribs 31 shown and from each other, can be provided.

Cover 16 includes a contoured top surface 32 joining at its periphery at the sides and back with a downturned skirt generally indicated by the numeral 33. Skirt 33 includes a generally vertical upper tier 34 and generally vertical lower tier 35 separated by a bevelled portion 36. Extending internally of container 10 from bevelled portion 36 and adjacent lower tier 35 are a plurality of guide and stop tabs 37 which slide over and engage lip 25 at the top of side walls 12 and 13 when cover 16 is closed on container 10.

A tapered front surface 38 of cover 16 extends from the periphery of the front of top surface 32 downwardly to a vertical front surface 39 which is generally a continuation of the lower tier 35 of skirt 33. Tapered front surface 38 is provided with a recessed area 40 having ribs 41 on the horizontal surface thereof. Vertical front surface 39 has a grip tab 42 at its lower medial end with a lock barb 43 (FIGS. 2 and 3) protruding from the underside thereof to engage cutout portion 21 of flange 19 of front wall 14. In conjunction with the gripping of ribs 41, grasping of tab 42 provides a facile manner in which to open and close container 10 by moving lock barb 43 out of or into engagement with front wall 14. Furthermore, grasping gripping area 20 and ribs 41 render carrying of container 10 in a closed condition convenient.

As is often the case when a user has completed the filing of diskettes D in or the withdrawal of diskettes D from container 10, dividers 29 are normally forwardly inclined as shown in FIG. 2. As such, and unless container 10 were made deeper thereby taking up more space, there is the possibility that cover 16 would not properly close but rather would lodge against the top of dividers 29. In order to automatically prevent that occurrence, a camming surface 44 is provided internally of cover 16 on each side of recessed area 40 thereby positioning a camming surface 44 in longitudinal alignment with tabs 30 of dividers 29 whether those dividers are positioned in container 10 with their tabs 30 on the right, left, or both as previously described. Then as cover 16 is being closed, that is, moving from the FIG. 2 to the FIG. 3 position, tabs 30 of dividers 29, if they are in the way, are engaged by and ride along camming surface 44 and do not interfere with the closure. In addition to avoiding such interference with closure, camming surfaces also cause the divider 29 which it is contacting to swing backward and in a "domino" type effect, all dividers 29 will swing backward, as shown in FIG. 3, particularly if container 10 is substantially full of diskettes D. As such, when the user opens container 10 again, dividers 29 will be inclined rearwardly so that the indicia on tabs 30 is conveniently visible.

Figure 4:
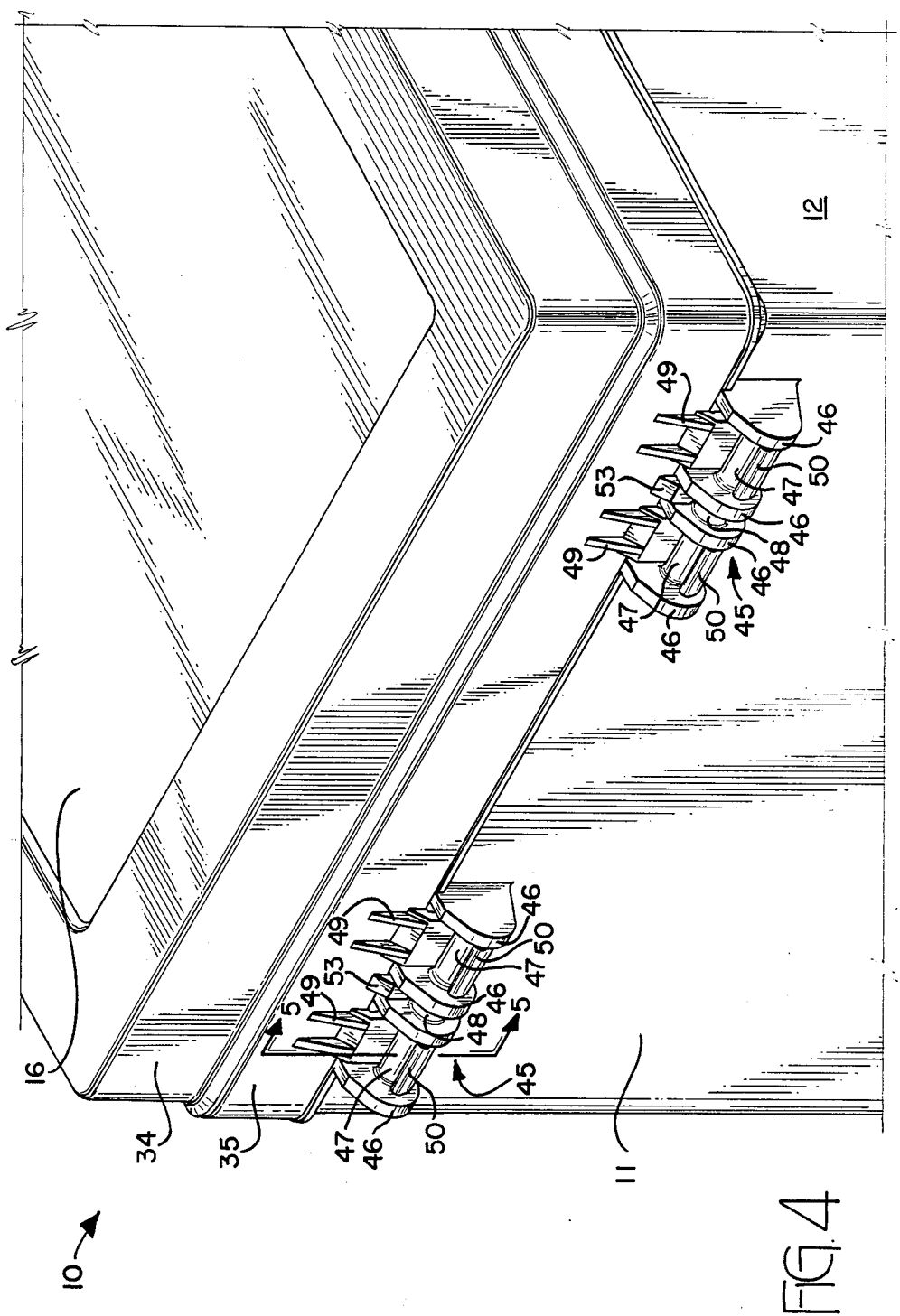
FIG. 4 is a partial rear perspective view of the container showing the hinge construction between the cover and the body of the container.

Cover 16 is attached to back wall 11 of container 10 by hinge assemblies indicated generally by the numeral 45 and best shown in FIGS. 4–6. Each hinge assembly 45 includes two pair of brackets 46 extending outwardly from back wall 11, each pair of brackets 46 carrying a hinge pin 47. A hub member 48 joins the adjacent brackets of each pair of brackets 46. Generally U-shaped hinge leaves 49 extend downwardly from lower tier 35 of skirt 33 of cover 16 and carry J-shaped hinge knuckles 50. Knuckles 50 engage and ride around hinge pins 47 during the swinging movement from the closed position shown in FIG. 5 to the open position shown in FIG. 6.

Back wall 11 is provided with a stop barb 51 which can engage a nub 52 on the lower end of knuckles 50. Thus, as shown in FIG. 6, the rotation of knuckles 50 is limited by stop barb 51 so that cover 16 is maintained in a generally vertical position when open.

While the J-shape of knuckles 50 might otherwise lend themselves to unintentional separation of the hinge, knuckles 50 are maintained in engagement with hinge pins 47, and thus the integrity of each hinge assembly is maintained, by a retainer lug 53 carried by lower tier 35 of skirt 33 of cover 16. Lug 53 rides on hub member 48 during movement of knuckles 50 around pins 47 so that, for example, downward pressure on knuckles 50 will not permit their removal from engagement with pins 47. In addition, because lug 53 is positioned between the pairs of brackets 46, lateral stability to hinge assembly 45 is also provided by lug 53.

Thus, container 10 herein described provides a convenient receptacle for diskettes and the like having a cover which easily closes without blockage from the file dividers and diskettes stored therein while at the same time shifting the dividers to their most usable position when the container is re-opened. Cover 16 is also provided with a hinge construction which maintains the cover vertically oriented while open and at the same time maintains the permanent integrity of the hinge. It should thus be appreciated that a container constructed according to the concepts of the present invention represents a substantial improvement in the art and otherwise accomplishes the objects of the present invention. While the preferred embodiment of the present invention has been described herein, the teachings herein are not intended to be so restricted. Other embodiments which might utilize the teachings herein set forth are intended to be within the scope of the subject invention.

We claim:

1. A container for computer floppy diskettes and the like comprising a container body portion open at the top thereof, divider means within said body portion to separate the same into separate areas, said divider means being arcuately swingable within said body portion, a cover for closing said body portion, and an arcuate camming surface on the underside of said cover positioned so as to be engageable with said divider means to arcuately swing the same when said cover is being closed on said body portion.

2. A container according to claim 1 wherein said divider means includes a portion extending upwardly above the open area at the top of said body portion and said camming surface engages said portion of said divider means.

3. A container according to claim 2 wherein said cover has a top portion located above said portion of said divider means and a tapered portion located below said portion of said divider means, said tapered portion carrying said camming surface so as said cover is being closed on said body portion said camming surface will engage said portion of said divider means.

4. A container according to claim 1, said body portion including a container bottom, said bottom having a plurality of apertures therein, said divider means having lock barbs at the bottom thereof, said lock barbs being selectively received in said apertures for arcuate movement thereabout.

5. A container according to claim 1, said body portion including generally vertical side walls with a generally vertical back wall therebetween, the tops of said side walls and back wall being provided with a lip, said cover having means to engage said lip upon closure of said cover onto the top of said side walls and back wall.

6. A container according to claim 1, said body portion including generally vertical side walls with a generally vertical back wall therebetween, rib means extending from said side walls into said container, said rib means being spaced from said back wall so that a diskette carrying case may be held between said rib means and said back wall.

7. A container according to claim 1, said body portion including a front wall, said front wall including a gripping flange extending downwardly from the top of said front wall.

8. A container according to claim 7, said cover having a generally horizontal top portion and a generally vertical downwardly directed skirt portion, a grip tab extending downwardly from said skirt portion adjacent said front wall, and locking means on said grip tab to engage said gripping flange on said front wall when said cover is closed on said body portion of the container.

9. A container according to claim 1 further comprising hinge assembly means swingably connecting said cover to said body portion.

10. A container according to claim 9, said hingge assembly means including means to limit the swinging relative movement of said cover and said body portion so that said cover is generally vertically oriented when fully open from said body portion.

11. A container according to claim 10, said hinge assembly means including a pair of brackets extending outwardly from said body portion, a hinge pin extending between said brackets, and a hinge knuckle carried by said cover, said knuckle riding around said hinge pin during the swinging movement of said cover relative to said body portion.

12. A container according to claim 11, said means to limit the swinging relative movement including a stop barb on said body portion and a nub on said knuckle, said nub engaging said stop barb to limit the swinging movment.

13. A container according to claim 11, said knuckle being J-shaped and said hinge assembly means including means to retain said knuckle on said hinge pin.

* * * * *